July 22, 1969 P. HOEKSTRA 3,457,401
LIGHT PROJECTION SYSTEM
Filed Jan. 5, 1967 2 Sheets-Sheet 2

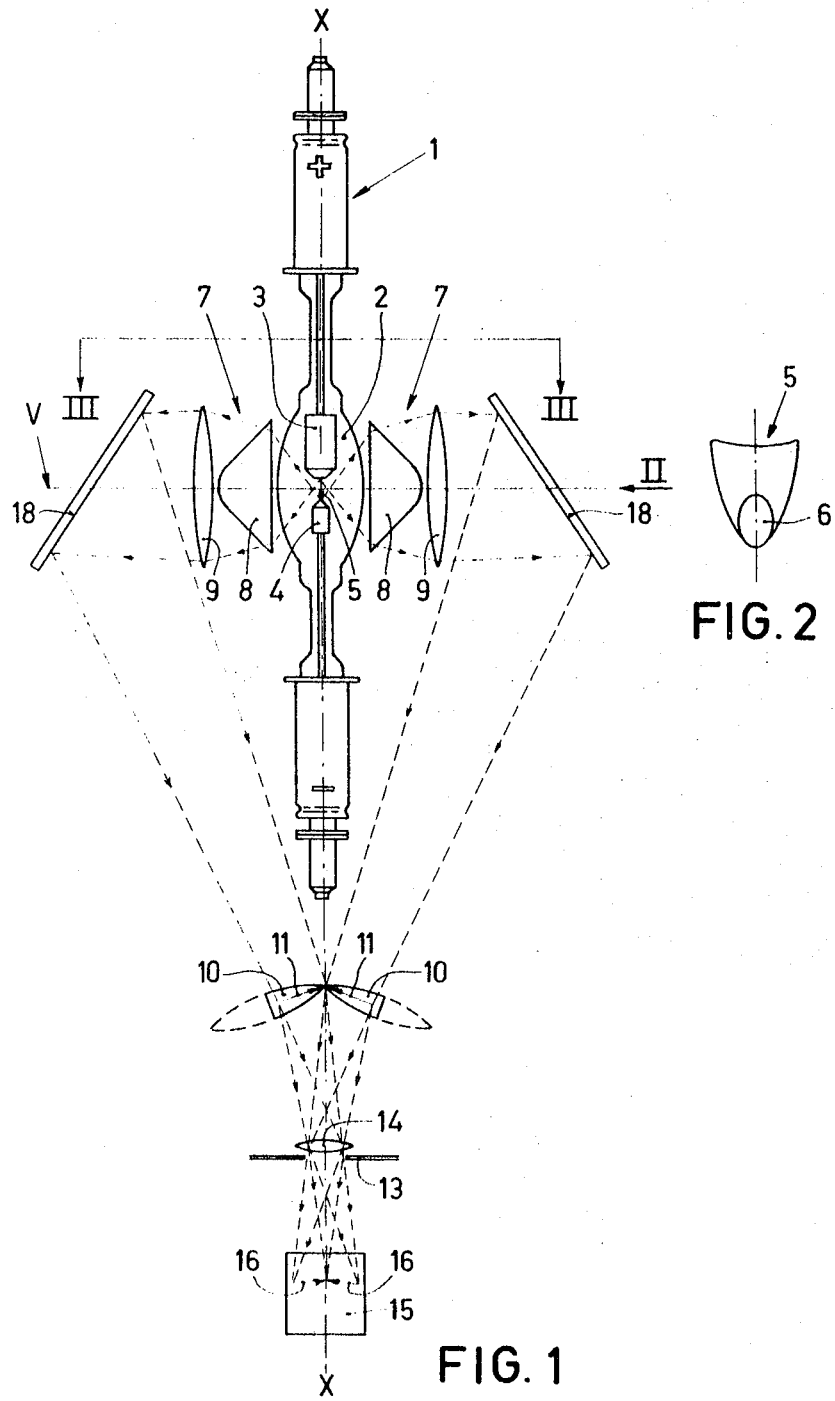

INVENTOR.
PIET HOEKSTRA
BY
AGENT

United States Patent Office 3,457,401
Patented July 22, 1969

3,457,401
LIGHT PROJECTION SYSTEM
Piet Hoekstra, Emmasingel, Eindhoven, Netherlands, assignor, by mesne assignments, to U.S. Philips Corporation, New York, N.Y., a corporation of Delaware
Filed Jan. 5, 1967, Ser. No. 607,435
Claims priority, application Netherlands, Jan. 8, 1966, 6600242
Int. Cl. F21v *13/04*
U.S. Cl. 240—41.3        7 Claims

ABSTRACT OF THE DISCLOSURE

This optical system utilizes a gas-discharge lamp light source producing a longitudinal arc having a bright portion at one end thereof. Condenser lenses in a plane transverse to the lamp surround the arc and gather and form the light into generally triangular images, each having a bright portion. Adjacent each condenser is a mirror for deflecting the light to an axially spaced diaphragm and to a projection lens where the images are formed with their respective bright portions mutually adjacent and about the optical axis of the projection lens.

---

This invention relates to lighting systems for projection purposes, comprising a light source which is approximately bell-shaped, such as the arc of a xenon gas-discharge lamp. Substantially the full light flux is directed by optical means such as condensers surrounding the light source, through a diaphragm or a gate onto the entrance pupil of a projecting lens; images of the light source have approximately triangular shapes and are produced in or near a plane transverse to the optical axis of the projecting lens and in this lens.

In a known lighting system of this kind two condensers and two concave mirrors are arranged around a xenon gas-discharge lamp. Approximately half of the light flux emitted by the discharge arc is intercepted by each condenser and concave mirror which co-acts with it. Each half of the light flux is directed through the diaphragm onto the entrance of the projecting lens by means of a field lens and possibly a diaphragm lens, and a plane deflection mirror is used with at least one of the light beams emitted by a condenser. This system combines the advantage of approximately complete utilization of the emitted light flux with satisfactory distribution of the light in the diaphragm aperture. The latter is achieved with the field lenses which produce images of the condensers in the vicinity of the diaphragm. The useful features in prior art described above are offset by the following disadvantage. The images of the light source produced in or near the projecting lens by the optical means described, are approximately triangular and overlap in part, thus forming a pattern having a boundary which differs greatly from the circular shape. To permit interception of the complete light flux found in this pattern, the entrance pupil of the projecting lens must be comparatively large and is thus filled only partly by the pattern. In addition, this irregular distribution of luminosity over the entrance pupil of the projecting lens is not particularly suitable for the envisaged purpose since the zones of the greatest luminosity in the pattern are comparatively far remote from the optical axis due to the particular manner in which the images of the light source are arranged in the pattern in this prior art system.

In the lighting system according to the invention, the described disadvantages are largely suppressed, and in contrast with the prior art the peculiar shape and the irregular distribution of the light from the light source are utilized advantageously. To this end, a lighting system of the above-mentioned kind is characterized in that the light source and the optical means are arranged relative to the optical axis of the projecting lens, so that the images of the light source are arranged in accordance with a regular, substantially star-shaped pattern in which the brightest parts of the images lie approximately in this optical axis.

The advantage is thus obtained that the outer periphery of the regular pattern of images may approximate the shape of a circle, thus permitting satisfactory filling of the aperture of the projecting lens. In addition, the brightest parts of the images are not distributed over the pattern, but are concentrated at the centre thereof and hence appproximately in the optical axis of the projecting lens.

Several relative arrangements of the light source, the optical means, the diaphragm and the projecting lens are possible in a lighting system according to the invention. Condenser mirrors as well as condenser lenses can be used, and in general a plurality of deflection mirrors, preferably plane, will be required. Field lenses and a diaphragm lens are not necessary but may be used for further improvement of the light distribution. One advantageous embodiment of the lighting system according to the invention is characterized in that the light source is substantially surrounded, at least in and near a plane transverse to its longitudinal axis, by three or more condensers the optical axes of which are located in or near and substantially parallel to the plane. The longitudinal axis of the light source substantially coincides with, or is substantially parallel to, the optical axis of the projecting lens or possibly a mirror image thereof. Preferably, a deflection mirror and a field lens are added to each condenser, the condenser may comprise a plurality of lenses. The deflection mirrors may be formed as so-called cold light mirrors.

When using a sufficient number of condensers arranged about the light source, this new system results in substantially complete filling of the aperture of the projecting lens with the light image pattern. In another embodiment of the lighting system according to the invention, the same object may be attained by using a plurality of light sources, each having to be provided with only a limited number of condensers. This latter embodiment is characterized in that to two or more substantially bell-shaped light sources, each equipped with associated optical means, are arranged relative to the optical axis of a projecting lens common to the light sources; in the resulting pattern of images, the images of one light source are located between those of another light source.

The lighting system according to the invention may be used especially for those projection purposes where it is important to have the highest possible utilization of the light flux emitted by the light source, and at the same time to have a brightness distribution of the projected light which is as uniform as possible. This is the case if a wide projection screen has to be illuminated through a comparatively small diaphragm, such as in film projection. This interest also exists in lighting an image area on the concave mirror of a television picture projector according to the so-called Eidophor system.

In order that the invention may be readily carried into effect, it will now be described in detail, by way of example, with reference to the accompanying diagrammatic drawings. These drawings show only one embodiment of the lighting system, which utilizes four condensers, four corresponding plane deflection mirrors, and a field lens and the longitudinal axis of the light source coincides with the optical axis of the projecting lens.

FIGURE 1 is a plan view of the system;
FIGURE 2 shows, on a greatly enlarged scale, the cylindrical light source in a side view in the direction indicated by arrow II of FIGURE 1;

Figure 3:
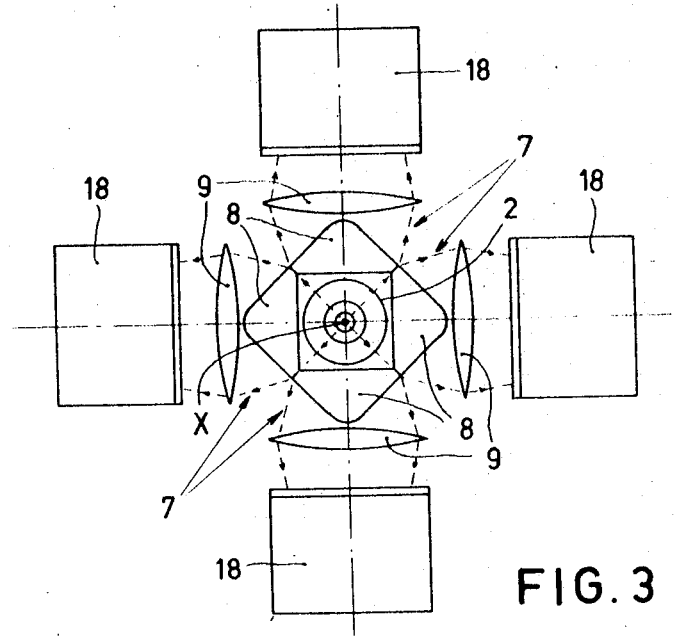
FIGURE 3 is a sectional view, taken on the line III—III of FIGURE 1.

A xenon gas-discharge lamp 1 comprises a glass bulb 2 containing two electrodes, an anode 3 and a cathode 4. A discharge arc 5 is present between the anodes when the lamp is in operation, the arc 5 being shown diagrammatically as an arrow in FIGURE 1. For the sake of clarity, FIGURE 2 is a diagrammatic view of the discharge arc 5 in the direction of arrow II from which the bell-shape thereof is clearly seen. The portion of the arc 5 as indicated by 6 is the brightest zone, which is present near the cathode 4 in the case of a xenon gas-discharge lamp, as shown.

In the illustrated embodiment the bulb 2 is surrounded by four condensers 7 each comprising an aspherical lens 8 and a second lens 9. As a matter of fact, each condenser may comprise more or fewer lenses or differently shaped lenses. The optical axes of the condensers 7 are located in a plane V so that the aspherical lenses 8 of the condensers jointly surround the light source 5 at least near the plane V, and approximately all of the light flux emitted by the light source 5 is intercepted by the condensers. FIGURES 1 and 2 show this too and also the further paths of the light rays in dashed lines and arrows.

Figure 4:
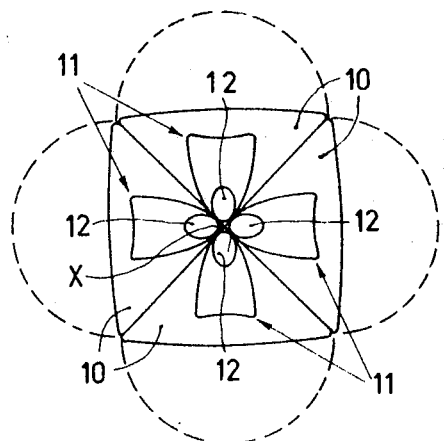
FIGURE 4 is an elevational view in the direction of the optical axis of the projection lens, showing the four field lenses and the light source images produced in them.

The light flux is directed via deflection mirrors 18 to four field lenses 10 in which images 11 of the light source 5 are produced by the condensers 7. The images 11 are again shown as arrows in FIGURE 1, and drawin diagrammatically in the elevational view of the field lenses 10 in FIGURE 4. These images are approximately triangular in shape and have their brightest zones 12 adjacent one another.

Figure 5:
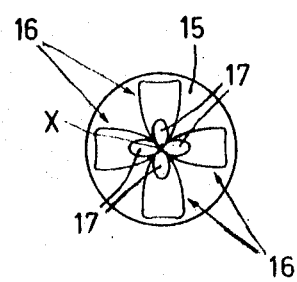
FIGURE 5 shows the pattern of light source images as produced in the projecting lens.

The condensers 7 or planes located in the vicinity thereof project images in or rear a diaphragm 13 by the field lenses 10 and a diaphragm lens 14 produces the pattern of the light source images 11 in a projecting lens 15. The resulting generally triangular light source image 16 have their brightest zones 17 located in or near the optical axis of the projecting lens 15, and form in this lens a regular generally star-shaped pattern which is indicated by arrows in FIGURE 1 and shown in the diagrammatic elevation view of FIGURE 5.

With the described lighting system according to the present invention, it is ensured not only that substantially all the light flux emitted by the light source 5 is utilized and the diaphragm aperture 13 is illuminated substantially uniformly. Another advantage obtained is that the outer periphery of the pattern of the light source images can approximate, at least locally, a circular shape of the entrance pupil of the projecting lens 15, resulting in satisfactory filling of the pupil. This filling may be improved further by adding to the pattern of the light source images 16, a second and similar pattern at the same area by means of a second lamp with associated condensers, deflection mirrors and possibly field lenses. Hence in the projecting lens in the example shown by means of further deflection mirrors, the light source images 16 of one pattern come to lie between those of the other.

As previously mentioned, the drawings show only one embodiment of a lighting system according to the invention, and several other arrangements of light sources and optical means are possible. In contrast with the situation indicated by the line X—X in FIGURE 1, the longitudinal axis of the light source and the optical axis of the projecting lens need not coincide. The deflection mirrors 18 may be so-called cold-light mirrors. Also it is possible to produce a pattern of light source images of the described shape in a plane transverse to the optical axis of the projecting lens and not necessarily located at the area of this lens, without the use of field lenses and a diaphragm lens.

What is claimed is:

1. An optical system for use with a diaphragm and a projection lens, comprising: (a) gas-discharge lamp light source producing a longitudinal arc with a bright portion at one end thereof; (b) at least two opposed condensers disposed adjacent and generally surrounding the light source for gathering substantially the full light flux emitted by said source, the condensers being aligned in a plane transverse to the lamp axis and establishing generally triangular-shaped images; and (c) a mirror adjacent each light condenser for deflecting light from the condenser through a diaphragm axially spaced from the lamp and to the projection lens, (d) the light from the arc being formed as multiple images in a plane of the projection lens transverse to its optical axis, the images having their bright portions mutually adjacent about said optical axis.

2. An optical system as defined in claim 1 comprising four of said condensers and corresponding mirrors disposed completely around the lamp.

3. An optical system as defined in claim 1 further comprising a field lens between each mirror and the diaphragm, and a diaphragm lens between the field lenses and the diaphragm.

4. An optical system as defined in claim 2 wherein the images form in the projection lens a pattern whose outer periphery approximates a circle, with the brightest portions of the images concentrated at the center of the circle.

5. An optical system as defined in claim 1 wherein said arc is bell-shaped, one end of the bell being the bright portion of the arc.

6. An optical system as defined in claim 4 wherein the lamp has a longitudinal axis which is coincident with the optical axis of the projection lens.

7. An optical system for use with a diaphragm and a projection lens, comprising: (a) gas-discharge lamp light source producing a longitudinal arc with a bright portion at one end thereof; (b) means disposed adjacent and generally surrounding the light source for gathering substantially the full light flux emitted by said source, and projecting said light to said diaphragm axially spaced from the source, and (c) the light from the arc being formed as multiple images in a plane of the projection lens transverse to its optical axis, the images having their bright portions mutually adjacent about said optical axis.

References Cited

UNITED STATES PATENTS 2,817,997    12/1957    Ulffers.

FOREIGN PATENTS 988,248    4/1965    England.
1,109,510    9/1955    France.

NORTON ANSHER, Primary Examiner

ROBERT P. GREINER, Assistant Examiner

U.S. Cl. X.R.

353—82